United States Patent
Liang et al.

(10) Patent No.: US 8,412,830 B2
(45) Date of Patent: Apr. 2, 2013

(54) METHOD AND APPARATUS FOR IMPROVING SIP PARSE PERFORMANCE

(75) Inventors: Zhi Yong Liang, Beijing (CN); Wei Lu, Beijing (CN); Ravinder Kumar Sabhikhi, Research Triangle Park, NC (US); Ling Shao, Beijing (CN); Bo Yang, Beijing (CN); Yi Xin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 12/446,982

(22) PCT Filed: Oct. 24, 2007

(86) PCT No.: PCT/EP2007/061403
§ 371 (c)(1),
(2), (4) Date: Dec. 7, 2009

(87) PCT Pub. No.: WO2008/049853
PCT Pub. Date: May 2, 2008

(65) Prior Publication Data
US 2010/0070633 A1    Mar. 18, 2010

(30) Foreign Application Priority Data
Oct. 24, 2006    (CN) .......................... 2006 1 0137158

(51) Int. Cl.
*G06F 15/16* (2006.01)
(52) U.S. Cl. ......... 709/227; 709/228; 709/229; 709/232
(58) Field of Classification Search .................. 709/227, 709/228, 229, 232
See application file for complete search history.

(56) References Cited

U.S. PATENT DOCUMENTS

| | | | |
|---|---|---|---|
| 6,807,173 B1 * | 10/2004 | Lee et al. | 370/389 |
| 7,412,541 B1 * | 8/2008 | Stadler et al. | 709/247 |
| 2002/0116605 A1 | 8/2002 | Berg | |
| 2004/0088424 A1 | 5/2004 | Park et al. | |

(Continued)

FOREIGN PATENT DOCUMENTS

| | | |
|---|---|---|
| EP | 1376878 B1 | 1/2004 |
| JP | 2005506717 A2 | 3/2005 |

(Continued)

OTHER PUBLICATIONS

G. Camarillo, "RFC 3486—Compressing the Session Initiation Protocol (SIP)", Feb. 2003, Packetizer, pp. 1-10.*

*Primary Examiner* — Firmin Backer
*Assistant Examiner* — Jonathan Bui
(74) *Attorney, Agent, or Firm* — Tutunjian & Bitetto, P.C.; Preston Young

(57) ABSTRACT

The present invention discloses a method and an apparatus for improving SIP parse performance. The method comprising the steps of: receiving a text-based SIP message to be sent to a SIP server; according to a SIP message filter table, determining whether the text-based SIP message needs to be transformed to a token-based message; and in the case that the text-based SIP message needs to be transformed to a token-based message, performing the transformation and sending the transformed token-based message to said SIP server, otherwise directly sending the text-based SIP message to said SIP server. According to the present invention, larger SIP message throughput in a SIP server and better utilization of resources of a front end device can be achieved.

6 Claims, 4 Drawing Sheets

U.S. PATENT DOCUMENTS

| | | | |
|---|---|---|---|
| 2004/0162032 A1* | 8/2004 | Li et al. | 455/72 |
| 2006/0031536 A1 | 2/2006 | Eydelman et al. | |
| 2006/0068761 A1 | 3/2006 | Chambers et al. | |
| 2008/0147801 A1* | 6/2008 | Foti | 709/206 |
| 2008/0205330 A1* | 8/2008 | Stadler et al. | 370/328 |
| 2008/0232392 A1* | 9/2008 | Liang et al. | 370/450 |

FOREIGN PATENT DOCUMENTS

| | | |
|---|---|---|
| JP | 2005339550 A2 | 12/2005 |
| WO | WO2005011175 | 2/2005 |

* cited by examiner

| SIP Server 1 Address | YES |
|---|---|
| SIP Server 2 Address | NO |
| SIP Server 3 Address | YES |
| ...... | ...... |

Fig.3

| SIP Server | Type of Head | Priority |
|---|---|---|
| SIP Server 1 | "From" Head | 3 |
| SIP Server 1 | "To" Head | 2 |
| SIP Server 1 | "Via" Head | 1 |
| ...... | ...... | ...... |

Fig.4

METHOD AND APPARATUS FOR IMPROVING SIP PARSE PERFORMANCE

FIELD OF THE INVENTION

The present invention generally relates to the field of communication and, more particularly, to a method and an apparatus for improving SIP parse performance.

BACKGROUND OF THE INVENTION

Session initiation protocol (SIP) is a signaling protocol proposed by the Internet Engineering Task Force (IETF) in 1999. For the detailed information of SIP, please refer to IETF Request for Comments 3261 (RFC 3261).

As a foundational session control protocol, SIP is becoming more and more popular in telecom next-generation network (NGN) and IT collaborative solution.

SIP is a text-based message protocol. SIP parse consumes lots of resources, for example, CPU cycles. Particularly, tokenization and string matching are two resource-intensive (e.g. CPU cycles) operations. With SIP prevalence, SIP parse would become one potential bottleneck in SIP-based servers which comprise SIP proxy server, SIP redirection server and various SIP-supported application servers.

For SIP parse optimization, current mechanisms focus on software-based parsing optimization, such as IBM Websphere SIP Application Server. For parsing optimization of other text-based protocols, such as extensible markup language (XML), hardware offload is employed. But they don't focus on parse operation but syntax validation and security operations. (IBM and WebSphere are trademarks of International Business Machines Corporation in the United States, other countries or both.)

SUMMARY OF THE INVENTION

There is preferably provided a method and an apparatus for improving SIP parse performance so as to achieve larger SIP message throughput and better resource utilization.

According to a first aspect of the present invention, proposed is a method for improving SIP parse performance, comprising the steps of: receiving a text-based SIP message to be sent to a SIP server; according to a SIP message filter table, determining whether the text-based SIP message needs to be transformed to a token-based message; and in the case that the text-based SIP message needs to be transformed to a token-based message, performing the transformation and sending the transformed token-based message to said SIP server, otherwise directly sending the text-based SIP message to said SIP server.

According to a second aspect of the present invention, proposed is an apparatus for improving SIP parse performance, comprising: a SIP message filter table including rules concerning whether a text-based SIP message that has entered said apparatus and is to be sent to a SIP server needs to be transformed to a token-based message; a transformation module for, according to the SIP message filter table, determining whether the text-based SIP message needs to be transformed to a token-based message, in the case that the text-based SIP message needs to be transformed to a token-based message, performing the transformation and sending the transformed token-based message to said SIP server, otherwise directly sending the text-based SIP message to said SIP server.

According to a third aspect of the present invention, proposed is a method for improving SIP parse performance, comprising the steps of: monitoring SIP stack and/or up-layer SIP applications of a SIP server to obtain load information of the SIP server; according to some predefined rules, determining whether offload to a front end device that transforms a text-based SIP message to a token-based message is needed; and sending a control message to the front end device when offload to the front end device is needed.

According to a fourth aspect of the present invention, proposed is an apparatus for improving SIP parse performance, comprising: a load monitor for monitoring SIP stack and/or up-layer SIP applications of a SIP server to obtain load information of the SIP server, and according to some predefined rules, determining whether offload to a front end device that transforms a text-based SIP message to a token-based message is needed, and sending a control message to the front end device when offload to the front end device is needed; a first parse module for receiving the token-based message and parsing the token-based message to tokens used in SIP stack; and a second parse module for receiving the text-based SIP message and parsing the text-based SIP message to tokens used in SIP stack.

The invention may be implemented in computer software.

According to the above aspects of the present invention, the present application preferably has the following advantages:

The front end device (e.g. a switch, a router or other network equipment) preferably transforms text-based SIP messages to token-based messages (called SOE messages), and the SIP server preferably only needs to parse simple SOE messages and accordingly parse load of the server is greatly reduced;

The SIP server preferably monitors SIP stack and/or up-layer SIP applications, and offload to the front end device is preferably dynamically adjusted, and better utilization of resources of the front end device is achieved.

Therefore, the present invention can preferably achieve larger SIP message throughput in a SIP server and better resource utilization in a front end device

BRIEF DESCRIPTION ON THE DRAWINGS

Preferred embodiments of the present invention will now be described, by way of example only, and with reference to the following drawings:

FIG. 3 depicts an example of a SIP message filter table;

FIG. 4 depicts an example of a SIP header filter table;

DESCRIPTION OF THE PREFERRED EMBODIMENTS

Hereinafter, preferred embodiments of the present invention will be described in detail.

Figure 1:
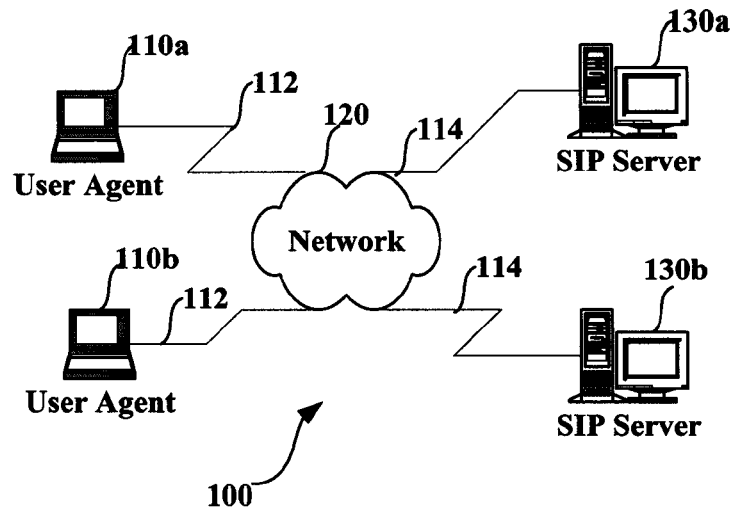
FIG. 1 depicts a system in which the present invention can be implemented in accordance with a preferred embodiment.

FIG. 1 depicts a system 100 in which the present invention can be implemented in accordance with a preferred embodiment. As depicted in FIG. 1, system 100 comprises: user agents 110a and 110b, a network 120, and SIP servers 130a and 130b.

Here, assuming user agent 110a is a SIP user agent client (UAC) and user agent 110b is a SIP user agent server (UAS), where UAC is used to initiate a request and UAS is used to respond to a request. Both user agents 110a and 110b can be implemented on entities such as SIP voice terminal, SIP video terminal and the like.

SIP servers 130a and 130b may be SIP agent servers, SIP redirection servers and various SIP-supported application servers.

Network 120 may be a wireless network, a wired network, or a combination thereof. Additionally, network 120 may be a local area network, a metropolitan area network, a wide area network or a combination thereof Network 120 may comprise many network equipments, such as switches, routers and the like (not depicted).

User agents 110a and 110b are connected to network 120 via links 112. SIP servers 130a and 130b are connected to network 120 via links 114. Links 112 and links 114 may be wired links or wireless links, such as coaxial cables, optical fibers or satellite links.

Since SIP servers 130a and 130b are situated behind network equipments on network 120, i.e. messages sent to SIP servers 130a and 130b pass across network equipments on network 120, network equipments are called front end devices. Moreover, these front end devices generally have lots of resources (e.g. CPU cycles) available for utilization. In other words, resources of these front end devices are idle in most time.

Of course, those skilled in the art should understand that the number of the user agents and the SIP servers are illustrative and not restrictive.

The solution disclosed preferably diverts part of functions of a SIP server to a front end device. That is, according to specific conditions, the front end device performs resource-intensive operations (transforming text-based SIP message to token-based message (called SOE message), i.e. the front end device performs tokenization). Thus, the SIP server only needs to parse simple SOE message. Accordingly, parse load of the SIP server is greatly reduced, and larger SIP message throughput of the SIP server and better utilization of resources of the front end device are achieved.

The SIP server monitors its SIP stack and up-layer SIP applications to determine whether it is needed to perform offload to the front end device (i.e. the front end device performs tokenization).

Figure 2:
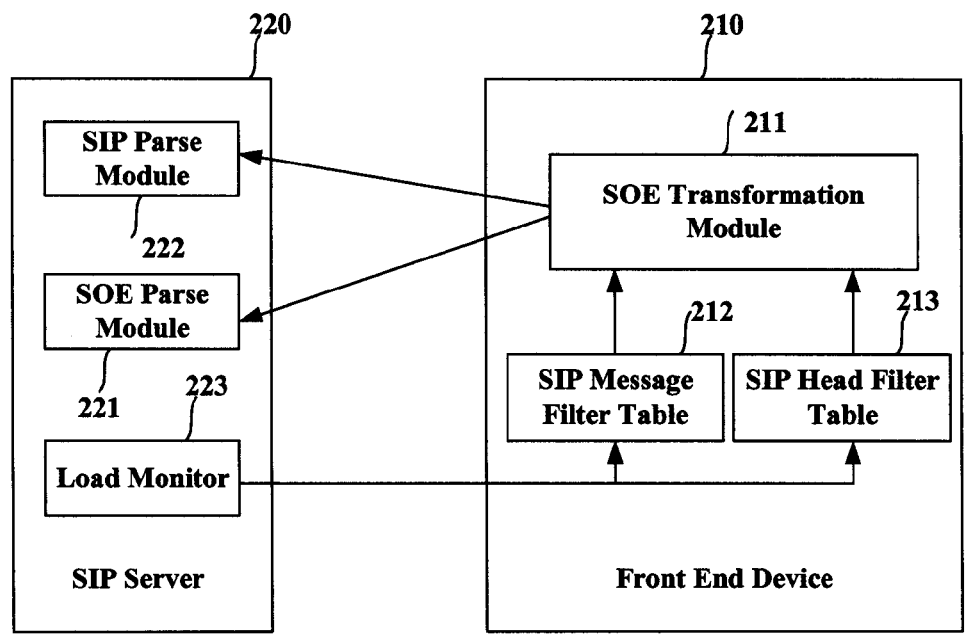
FIG. 2 depicts block diagrams of a SIP server and a front end device and depicts the relation therebetween according to an embodiment of the present invention.

FIG. 2 depicts block diagrams of a SIP server 220 and a front end device 210 and depicts the relation between them according to an embodiment of the present invention. The SIP server 220 may be, for example, the SIP server 130 a or the SIP server 130b in FIG. 1.

As depicted in FIG. 2, the SIP server 220 comprises:
a SOE parse module (first parse module) 221 for receiving token-based messages and parsing the token-based messages to tokens used in SIP stack;
a SIP parse module (second parse module) 222 for receiving text-based SIP messages and parsing the text-based SIP messages to tokens used in SIP stack; and
a load monitor 223 for monitoring SIP server 220. For example, the load monitor 223 monitors SIP stack and/or up-layer SIP applications of SIP server 220 to obtain load information of SIP server 220. Moreover, load monitor 223 determines, according to some predefined rules (e.g. load threshold), whether offload to a front end device is needed, and if yes, sends a control message to the front end device to update a SIP message filter table and a SIP header filter table in the front end device, as will be described in detail below. It should be noted that the predefined rules can be dynamically adjusted.

Front end device 210 comprises:
a SIP message filter table 212 including rules (coarse granularity)for determining whether text-based SIP messages which have entered front end device 210 and are to be sent to SIP server 220 need to be transformed to token-based messages; and
a SOE transformation module 211 for determining, according to SIP message filter table 212, whether the text-based SIP messages need to be transformed to token-based messages, in the case that the text-based SIP messages need to be transformed to token-based messages performing the transformation and sending the transformed token-based messages to SIP server 220, otherwise, directly sending the text-based SIP messages to SIP server 220.

A text-based SIP message comprises headers, and front end device 210 further comprises a SIP header filter table 213, and SOE transformation module 211 determines, according to SIP header filter table 213, whether a header of the text-based SIP message, which has been determined to be transformed according to SIP message filter table 212, needs to be transformed to a token-based format, in the case that the header needs to be transformed to a token-based format, performs the transformation on the header of the text-based SIP message, and sends the transformed header to SIP server 220, otherwise, sends the header to SIP server 220 without transforming it.

FIG. 3 depicts an example of SIP message filter table 212.

As depicted in FIG. 3, in this table, each SIP server (represented by an identifier (e.g. SIP server address) uniquely identifying a SIP server) has an indicator indicating whether to perform SOE transformation. For example, "SIP server 1" has an indicator indicating "Yes," "SIP server 2" has an indicator indicating "No," "SIP server 3" has an indicator indicating "Yes," etc. In other words, a text-based SIP message to be sent to SIP server 1 needs to be SOE transformed at front end device 210; a text-based SIP message to be sent to SIP server 2 does not need to be SOE transformed at front end device 210; and a text-based SIP message to be sent to SIP server 3 needs to be SOE transformed at front end device 210. This is a coarse-granularity rule for controlling SOE transformation module 211 whether or not to transform a text-based SIP message entering front end device 210 to a token-based message.

In order to control SOE transformation module 211 whether or not to transform a text-based SIP message entering front end device 210 to a token-based message with fine granularity, and seeing that a SIP message comprises various headers, such as "Via" header, "To" header and "From"

header, SIP header filter table 213 is further comprised in this embodiment of the present invention.

FIG. 4 depicts an example of a SIP header filter table 213.

As depicted in FIG. 4, a "Via"-type header of SIP server 1 has a priority of 1, a "To"-type header of SIP server 1 has a priority of 2, a "From"-type header of SIP server 1 has a priority of 3, etc. In this embodiment of the present invention, assumed that headers with the priority equal to or larger than 2 need to be transformed at front end device 210. In other words, a "Via" header of a text-based SIP message to be sent to SIP server 1 does not need to be transformed at front end device 210; a "To" header of a text-based SIP message to be sent to SIP server 1 needs to be transformed at front end device 210; and a "From" header of a text-based SIP message to be sent to SIP server 1 needs to be transformed at front end device 210.

Here, SIP header filter table 213 comprises priorities of headers of all SIP servers (SIP server 1, SIP server 3) each with an indicator indicating to perform SOE transformation. Of course, those skilled in the art may understand that a SIP header filter table can be stored for each SIP server with an indicator indicating to perform SOE transformation.

The following codes depict an example of a SIP INVITE message:

```
INVITE sip:bob@biloxi.com SIP/2.0
Via: SIP/2.0/UDP pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 INVITE
Contact: <sip:alice@pc33.atlanta.com>
Content-Type: application/sdp
Content-Length: 142
    ...(BODY)...
```

Table 1 depicts results from processing the above SIP INVITE message by SOE transformation module 211. As is clear from Table 1, a text-based SIP message is transformed to a SOE message that is a binary message.

TABLE 1

| Type_A (8 Bits) | | Type_B (8 Bits) | | Value_or_Pointer (Ptr) (16 Bits) | |
|---|---|---|---|---|---|
| Name | Code | Name | Code | Type | Value or Buffer Content pointed by Ptr |
| INVITE | 1 | scheme | 2 | Ptr | "SIP" |
| INVITE | 1 | user | 3 | Ptr | "bob" |
| INVITE | 1 | hostname | 5 | Ptr | "biloxi.com" |
| INVITE | 1 | major-version | 50 | Ptr | 2 |
| INVITE | 1 | minor-version | 51 | Ptr | 0 |
| Via | 74 | protocol-name | 72 | Ptr | "SIP" |
| Via | 74 | protocol-version | 73 | Ptr | "2.0" |
| Via | 74 | transport-param | 11 | Ptr | "UDP" |
| Via | 74 | hostname | 5 | Ptr | "pc33.atlanta.com" |
| Via | 74 | via-branch | 71 | Ptr | "z9hG4bKnashds8" |
| Max-Forwards | 54 | max-forwards | 66 | Ptr | "70" |
| To | 71 | display-name | 10 | Ptr | Bob |
| To | 71 | scheme | 2 | Ptr | "SIP" |
| To | 71 | user | 3 | Ptr | "bob" |
| To | 71 | hostname | 5 | Ptr | "biloxi.com" |
| From | 52 | display-name | 10 | Ptr | Alice |
| From | 52 | scheme | 2 | Ptr | "SIP" |
| From | 52 | user | 3 | Ptr | "alice" |
| From | 52 | hostname | 4 | Ptr | "atlanta.com" |
| From | 52 | tag | 52 | Ptr | "1928301774" |
| Call-ID | 40 | call-id-first-part | 17 | Ptr | "a84b4c76e66710" |
| CSeq | 48 | seq-number | 65 | Ptr | 314159 |
| CSeq | 48 | method-param | 13 | Ptr | "INVITE" |
| Contact | 42 | scheme | 2 | Ptr | "SIP" |
| Contact | 42 | user | 3 | Ptr | "alice" |
| Contact | 42 | hostname | 5 | Ptr | "pc33.atlanta.com" |
| Content-Type | 47 | m-type | 79 | Ptr | "application" |
| Content-Type | 47 | m-subtype | 80 | Ptr | "sdp" |
| Content-Length | 46 | content-length | 64 | Ptr | 142 |
| Message-Body | −3 | content | −4 | Ptr | "...(BODY)..." |

As described above, when a load monitor of a SIP server determines offload to a front end device is needed, it sends a control message to the front end device to update the SIP message filter table and the SIP header filter table in the front end device, for example, change an indicator indicating whether or not to perform SOE transformation from "No" to "Yes" and add priorities of various headers of this SIP server to the SIP header filter table.

Of course, those skilled in the art may understand that the load monitor may also only send such a control message to the front end device, which control message is merely used to update the SIP header filter table.

The following codes depict an example of a SIP REGISTER message:

```
REGISTER sip:registrar.biloxi.com SIP/2.0
Via: SIP/2.0/UDP bobspc.biloxi.com:5060;branch=z9hG4bKnashds7
Max-Forwards: 70
To: Bob <sip:bob@biloxi.com>
From: Bob <sip:bob@biloxi.com>;tag=456248
Call-ID: 843817637684230@998sdasdh09
CSeq: 1826 REGISTER
```

-continued

Contact: <sip:bob@192.0.2.4>
Expires: 7200
Content-Length: 0

Table 2 depicts results from processing the above SIP REGISTER message by SOE transformation module 211. As is clear from Table 2, a text-based SIP message is transformed to a SOE message that is a binary message.

TABLE 2

| Type_A (8 Bits) | | Type_B (8 Bits) | | Value or Pointer (Ptr) (16 Bits) | |
|---|---|---|---|---|---|
| Name | Code | Name | Code | Type | Value or Buffer Content pointed by Ptr |
| REGISTER | 2 | scheme | 2 | Ptr | "SIP" |
| REGISTER | 2 | hostname | 5 | Ptr | "registar.biloxi.com" |
| REGISTER | 2 | major-version | 50 | Ptr | 2 |
| REGISTER | 2 | minor-version | 51 | Ptr | 0 |
| Via | 74 | protocol-name | 72 | Ptr | "SIP" |
| Via | 74 | protocol-version | 73 | Ptr | "2.0" |
| Via | 74 | transport-param | 11 | Ptr | "UDP" |
| Via | 74 | hostname | 5 | Ptr | "bobspc.biloxi.com" |
| Via | 74 | port | 6 | Value | 5060 |
| Via | 74 | via-branch | 71 | Ptr | "z9hG4bKnashds7" |
| Max-Forwards | 54 | max-forwards | 66 | Ptr | 70 |
| To | 71 | display-name | 10 | Ptr | Bob |
| To | 71 | scheme | 2 | Ptr | "SIP" |
| To | 71 | user | 3 | Ptr | "bob" |
| To | 71 | hostname | 5 | Ptr | "biloxi.com" |
| From | 52 | display-name | 10 | Ptr | Bob |
| From | 52 | scheme | 2 | Ptr | "SIP" |
| From | 52 | user | 3 | Ptr | "bob" |
| From | 52 | hostname | 5 | Ptr | "biloxi.com" |
| From | 52 | tag | 52 | Ptr | "456248" |
| Call-ID | 40 | call-id-first-part | 17 | Ptr | "843817637684230" |
| Call-ID | 40 | call-id-second-part | 18 | Ptr | "998sdasdh09" |
| CSeq | 48 | seq-number | 65 | Ptr | 1826 |
| CSeq | 48 | method-param | 13 | Ptr | "REGISTER" |
| Contact | 42 | scheme | 2 | Ptr | "SIP" |
| Contact | 42 | user | 3 | Ptr | "bob" |
| Contact | 42 | ipv4address | 8 | Ptr | "192.0.2.4" |
| Expires | 51 | delta-seconds | 60 | Ptr | 7200 |
| Content-Length | 46 | content-length | 64 | Ptr | 0 |

Figure 5:
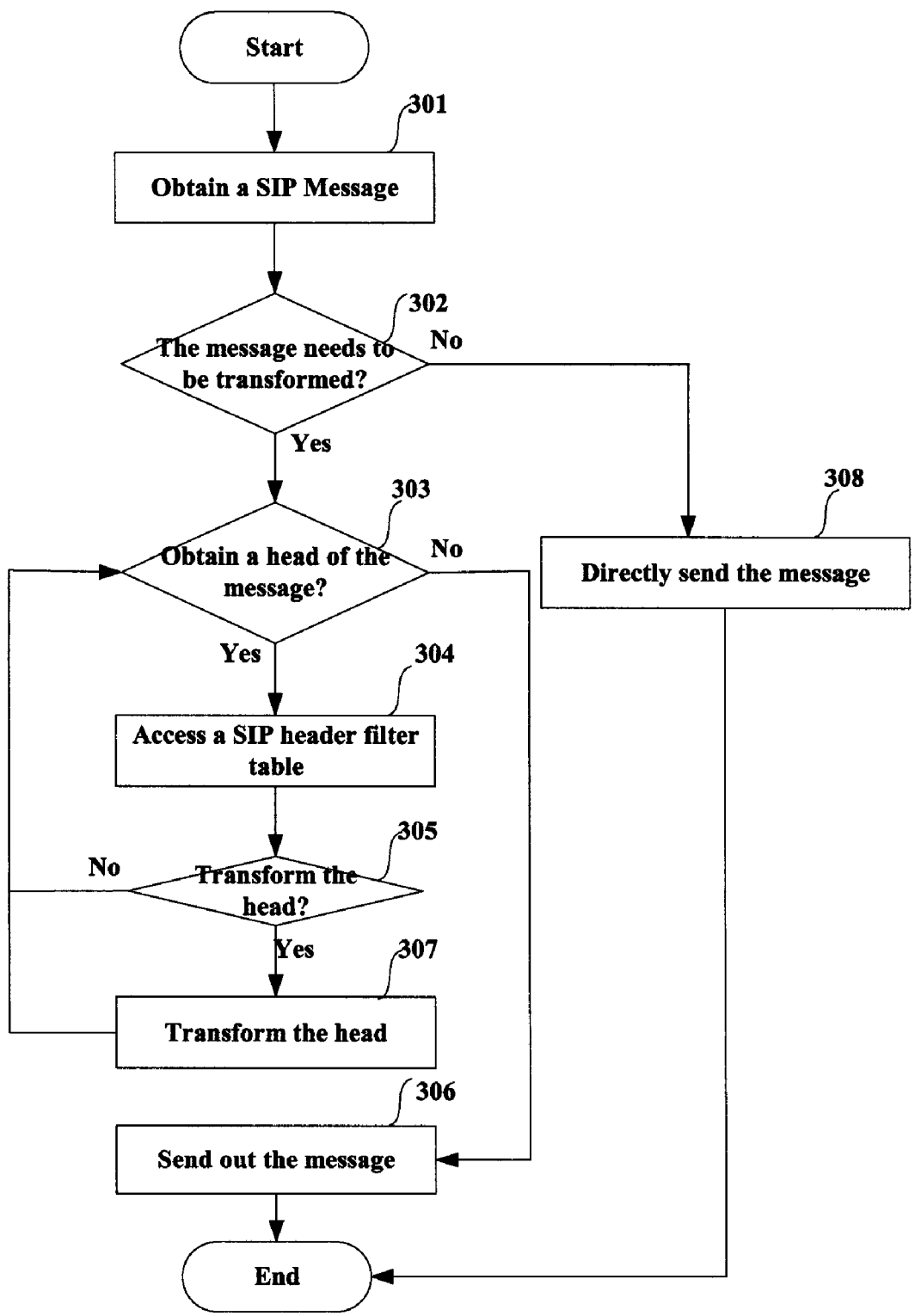
FIG. 5 depicts steps performed by a front end device according to an embodiment of the present invention.

FIG. 5 depicts steps performed by front end device 210 according to an embodiment of the present invention.

First, SOE transformation module 211 of front end device 210 obtains a text-based SIP message from network 120 (step 301).

Then, SOE transformation module 211 accesses SIP message filter table 212 in front end device 210 to judge whether the text-based SIP message needs to be transformed (judging 302). In table 212, each SIP server (represented by an identifier (e.g. SIP server address) uniquely identifying a SIP server) has an indicator indicating whether or not to perform SOE transformation (see FIG. 3). For example, according to SIP message filter table 212, SOE transformation module 211 can determine that a text-based SIP message to be sent to SIP server 1 needs to be SOE transformed at front end device 210, a text-based SIP message to be sent to SIP server 2 does not need to be SOE transformed at front end device 210, and a text-based SIP message to be sent to SIP server 3 needs to be SOE transformed at front end device 210.

When transformation is not needed (branch "No" of judging 302), SOE transformation module 211 directly sends the text-based SIP message to SIP parse module 222 in SIP server 220 (step 308), and the text-based SIP message is parsed by SIP parse module 222 to deliver tokens of the SIP message to SIP stack. And the flow ends.

When transformation is needed (branch "Yes" of judging 302), SOE transformation module 211 judges whether a header of the SIP message is obtained (judging 303).

If a header of the SIP message is obtained (branch "Yes" of judging 303), SOE transformation module 211 accesses SIP header filter table 213 to determine the header's priority (step 304). SIP header filter table 213 comprises priorities of various types of header of each SIP server with an indicator indicating to perform SOE transformation (see FIG. 4).

For example, a "Via"-type header of SIP server 1 has a priority of 1, a "To"-type header of SIP server 1 has a priority of 2, and a "From"-type header of SIP server 1 has a priority of 3, etc. A corresponding priority is obtained according to the type of the header of said SIP message. Then, SOE transformation module 211 judges whether the header needs to be transformed to the token-based format (judging 305), and in the case that the header needs to be transformed to the token-based format (branch "Yes" of judging 305), performs the transformation on the header (step 307). Then, the flow returns to judging 303 to determine whether a next header is obtained. In the case that the header does not need to be transformed to the token-based format (branch "No" of judging 305), SOE transformation module 211 does not perform the transformation on the header, and then, the flow returns to judging 303 to judge whether a next header is obtained. For example, in this embodiment of the present invention, assumed headers with priorities equal to or larger than 2 need to be transformed at front end device 210. That is to say, if a header has a priority equal to or larger than 2, then SOE transformation module 211 transforms the header; if a header has a priority less than 2, SOE transformation module 211 does not transform the header, and the head keeps its text-based format.

If no header of the SIP message is obtained (branch "No" of judging 303), then SOE transformation module 211 sends to SIP server 220 such a message (step 306) that might comprise transformed header(s) which is(are) sent to SOE parse module 221 and non-transformed header(s) which is(are) sent to SIP parse module 222. Then, the flow ends.

Figure 6:
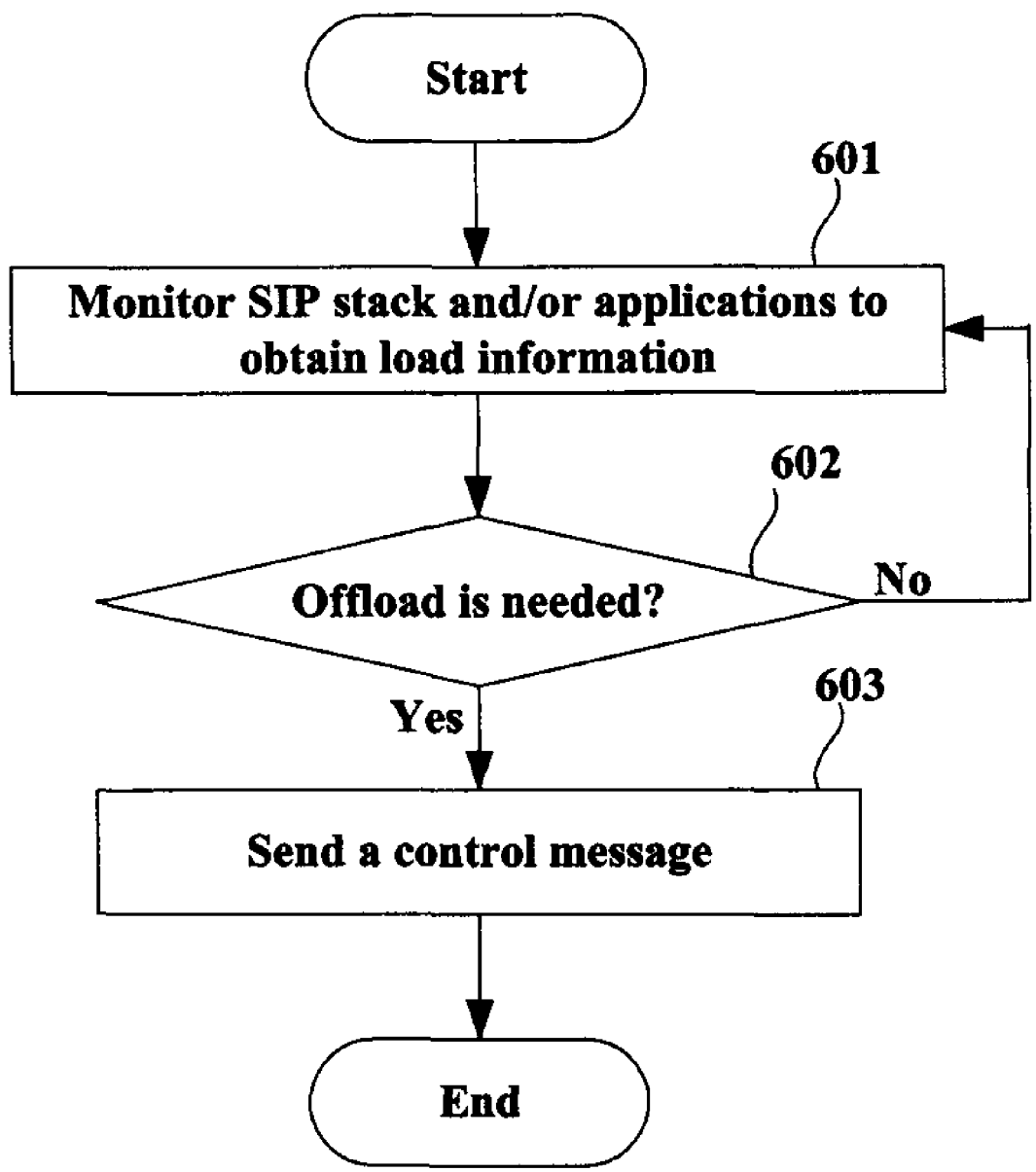
FIG. 6 depicts steps performed by a load monitor of a SIP server according to an embodiment of the present invention.

FIG. 6 depicts steps performed by load monitor 223 of SIP server 220 according to an embodiment of the present invention.

As depicted in FIG. 6, in step 601, load monitor 223 monitors SIP stack and/or up-layer SIP applications of SIP server 220 to obtain load information of SIP server 220, just as described previously.

Then, according to some predefined rules (e.g. load threshold), load monitor 223 determines whether offload to front end device 210 is needed.

When offload to front end device 210 is needed (branch "Yes" of judging 602), load monitor 223 sends a control message to front end device 210 (step 603) to update SIP message filter table 212 and SIP header filter table 213 in front end device 210.

When offload to front end device 210 is not needed (branch "No" of judging 602), load monitor 223 returns to step 601 to monitor SIP stack and/or up-layer SIP applications of SIP server 220 to obtain load information of SIP server 220.

It should be noted that in order to facilitate easier understanding of the present invention, the foregoing description omits more detailed technical details that are well known to those skilled in the art and might be indispensable to the implementation of the present invention.

The specification of the present invention has been presented for purposes of illustration and description, and is not intended to be exhaustive or limited to the present invention in the form disclosed. Many modifications and variations will be apparent to those of ordinary skilled in the art.

For example, SIP message filter table 212 and SIP header filter table 213 can also be inside SOE transformation module 211.

Therefore, the embodiments were chosen and described in order to best explain the principles of the invention, the practical application of the invention, and to enable others of ordinary skilled in the art to understand that all modifications and alterations made without departing from the spirit of the present invention fall into the protection scope of the present invention as defined in the appended claims.

The invention claimed is:

1. A method for improving session initiation protocol (SIP) parse performance, comprising the steps of:
    monitoring SIP stack and/or up-layer SIP applications of a SIP server to obtain load information of the SIP server;
    according to some predefined rules, determining whether offloading to a front end device, which transforms a text-based SIP message to a token-based message, is needed; and
    when offloading to the front end device is needed, sending a control message to the front end device, wherein the control message is used to update a SIP message filter table in the front end device, and according to the SIP message filter table, the front end device determines whether the text-based SIP message needs to be transformed to a token-based message.

2. The method according to claim 1, wherein the text-based SIP message comprises headers, the control message is further used to update a SIP header filter table in the front end device, and according to the SIP header filter table, the front end device determines whether a header of the text-based SIP message needs to be transformed to the token-based format.

3. The method according to claim 1, further comprising the step of:
    receiving at a parse module the token-based or text based message and parsing the message to tokens used in SIP stack.

4. An apparatus for improving session initiation protocol (SIP) parse performance, comprising:
    a load monitor for monitoring SIP stack and/or up-layer SIP applications of a SIP server to obtain load information of the SIP server, and according to some predefined rules, determining whether offloading to a front end device, which transforms a text-based SIP message to a token-based message, is needed, and when offloading to the front end device is needed, sending a control message to the front end device, wherein the control message is used to update a SIP message filter table in the front end device, and according to the SIP message filter table, the front end device determines whether the text-based SIP message needs to be transformed to a token-based message;
    a first parse module for receiving a token-based message and parsing the token-based message to tokens used in SIP stack; and
    a second parse module for receiving a text-based SIP message and parsing the text-based SIP message to tokens used in SIP stack.

5. The apparatus according to claim 4, wherein the text-based SIP message comprises headers, the control message is further used to update a SIP header filter table in the front end device, and according to the SIP header filter table, the front end device determines whether a header of the text-based SIP message needs to be transformed to the token-based format.

6. A computer storage device tangibly embodying computer readable instructions which when executed causes the computer to implement the steps of the improved method of claim 1.

* * * * *